Patented Nov. 12, 1929

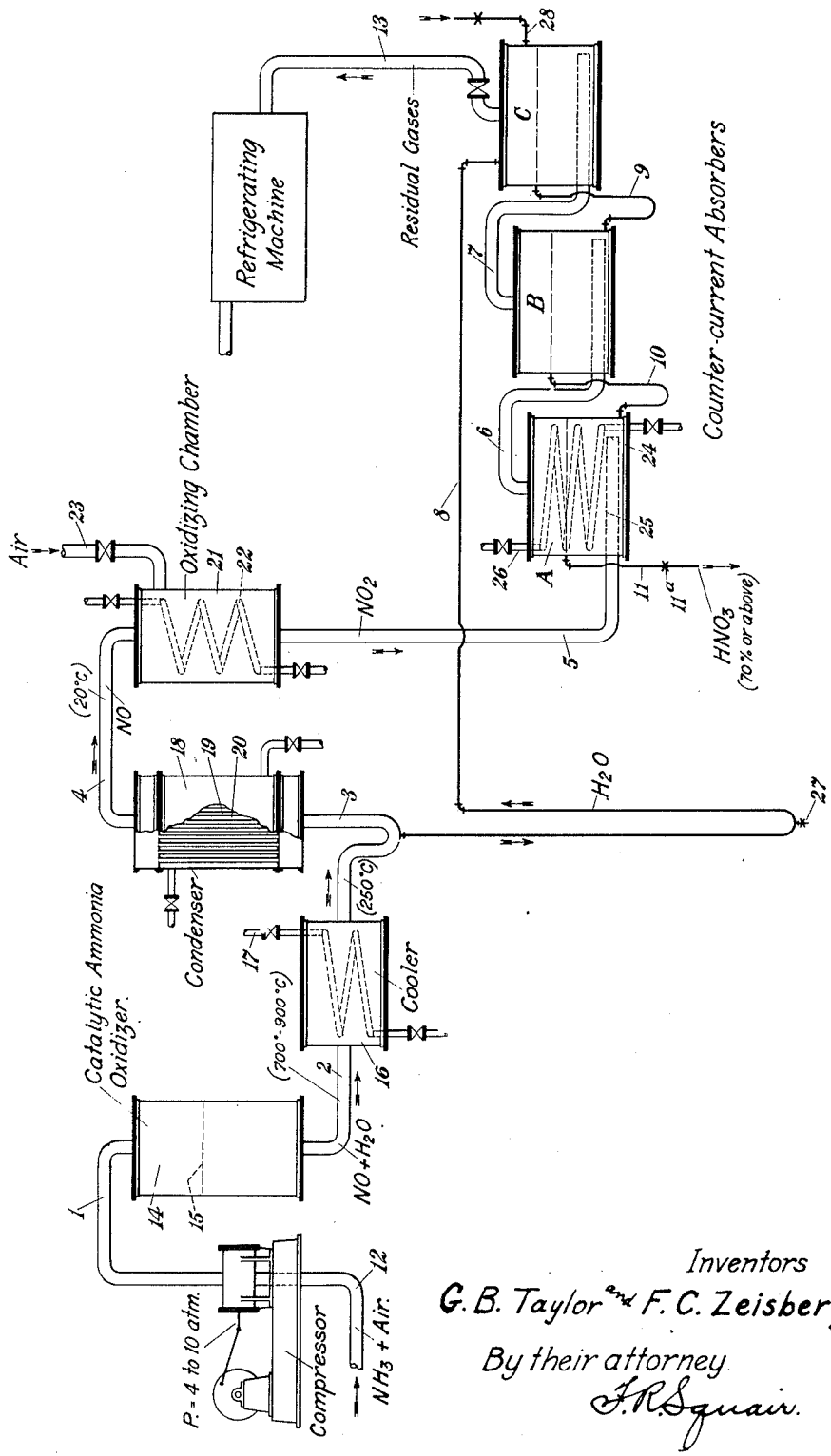

1,735,342

UNITED STATES PATENT OFFICE

GUY B. TAYLOR AND FRED C. ZEISBERG, OF WILMINGTON, DELAWARE, ASSIGNORS TO E. I. DU PONT DE NEMOURS & COMPANY, OF WILMINGTON, DELAWARE, A CORPORATION OF DELAWARE

PROCESS AND APPARATUS FOR THE MANUFACTURE OF NITRIC ACID

Application filed January 26, 1925, Serial No. 4,670. Renewed January 26, 1929.

This invention relates to the manufacture of nitric acid and has particularly to do with processes and apparatus for the manufacture of strong nitric acid by the oxidation of ammonia.

In oxidizing ammonia with air by the usual process at atmospheric pressure the concentration of the resulting nitrogen oxides is such that it is not economical to attempt to produce a nitric acid containing more than about 50% $HNO_3$, by absorption of these oxides in water in the presence of oxygen at atmospheric pressure. Even to give acid of no greater strength than this, the absorption system must be large and costly, making up from half to three quarters of the total cost of the plant. Moreover, a nitric acid of only 50% strength has but limited use in industry, and must be further concentrated to make it marketable in a wide field. We have devised a process which, while only requiring for its practice apparatus which is of relatively low cost and is small and simple, is yet capable of producing strong nitric acid, that is acid of higher strength than 50%, for example, 70%, or better. It is a major object of the invention to provide such a process; and it is a further object to provide an apparatus wherewith such process may be conveniently practiced. To these ends, and also to improve generally upon processes and apparatus of the character indicated, the invention consists in the various matters hereinafter described and claimed.

The accompanying drawing is a conventional and somewhat diagrammatic side elevational view, with certain parts in section to add clearness, of an apparatus assembly, embodying the invention as it relates to apparatus and with which the process of the invention may be performed, the major characteristics of the process being also indicated upon the drawing in approximate "flow sheet" form. Without restriction of the invention thereto it is, for convenience, described with reference to the drawing.

Generally speaking, the present process preferably comprises: oxidizing ammonia, introduced to the system as a gas together with air (oxygen), with the aid of a suitable catalyst, as platinum, activated iron oxide, and so forth, thus to produce nitric oxide and steam according to the equation, $4NH_3 + 5O_2 = 4NO + 6H_2O$; quickly cooling the gases while subjecting them to high pressure, for example 4 to 10 atmospheres (gauge) or higher, and permitting them to remain under this high pressure for a time, thus to oxidize the nitric oxide to nitrogen peroxide, $NO_2$, $(N_2O_4)$; and then causing the nitrogen peroxide to react with water, under high pressures such as those mentioned, to form nitric acid.

As mentioned, in this procedure the oxidation of the nitric oxide to nitrogen peroxide is at high pressure, as is also the absorption of the peroxide to produce the nitric acid. While at atmospheric pressures the reaction $2NO + O_2 = 2NO_2$ is a relatively slow one, with the present procedure in which pressure is used the reaction greatly increases its speed; wherefore the oxidizing chamber for the present process can be built very much smaller than would ordinarily be required, and, in consequence, and despite the fact that it must be built to withstand high pressure, can be erected at a very considerable saving in expense over what would, except for the present invention, be required. Also, the absorbers used in the final reaction or absorption can, because of the efficiency obtained by the high pressure, used in accordance with the present procedure, be much smaller than the usual towers necessary when operating at atmospheric pressure, and hence, notwithstanding the fact that they must be constructed to withstand high pressures, are cheaper to build than would be towers. Moreover, the absorbers can be free from the complicated and expensive devices used in ordinary towers for recirculation and advance of the absorbing liquid, since in the present process the absorbers can be so disposed that no moving machinery is required, except the pump used to compress the gases.

In the procedure, as more fully explained hereinafter, the steam is condensed from the mixture of nitric oxide and steam at such a time and in such manner that practically acid-free water is withdrawn, which water is then introduced into the absorbers to provide a countercurrent water flow.

Referring now to the drawing, the apparatus and the procedure will be described in detail:—The assembly comprises, as indicated by the legends, a compressor for the mixture of ammonia and air, a catalytic ammonia oxidizer, a cooler, a condenser, an oxidizing chamber, and a series (shown as three) of absorbers, A, B and C. Piping 1, 2, 3, 4, 5, 6, and 7 connects the units in series, for flow of gases from left to right (in the figure); a pipe 8 connecting the base of the condenser with the last absorber, C, and overflow pipes 9 and 10, from C to B and B to A, provide for the travel of condensate (water) from the condenser to the last absorber and (travelling to the left) through the absorbers to the acid-discharge outlet 11; and pipes 12 and 13, connected respectively with the compressor and the final absorber, serve for the introduction of the mixture of ammonia and air, and the escape of any residual gases.

The compressor may be of any suitable type, as may also the catalytic ammonia oxidizer which is conventionally shown as a chamber 14 with platinum 15 arranged therein for passage of the gases therethrough in contact therewith. The cooler, conventionally indicated by the chamber 16 with piping 17 for the circulation of cooling medium therethrough, is indicative of any suitable device, as a steam boiler through which the hot gases are passed, or a heat exchanger, whereby the heat of the gases may be conserved. The condenser is preferably of a type to provide for very rapid cooling and for the counterflow and draining off of the condensate, the illustrated condenser being conventionally shown as of the tubular type comprising the shell 18, tubes 19 for the passage of the gases to be condensed, and the chamber 20 for circulation of cooling medium about the tubes 19. The oxidizing chamber may be a simple shell 21 of sufficient size to ensure sufficient slowing up of the gases to give time for the completion of the reaction; desirably it is provided with piping 22 for the circulation of cooling medium, and with a valved pipe 23 for the admission of air (oxygen) if called for. The absorbers A, B, and C are closed tanks of any suitable construction arranged for the flow of water from C through B to A and the flow of gas from A through B to C. As shown, the gas admission pipe of each absorber, as the pipe 5 for the absorber A, is arranged close to the bottom of the absorber and is provided with a closed end 24, and with perforations 25 for the escape of gas in such wise that it will bubble upward through the liquid. Preferably each of the absorbers is provided with piping 26 for circulation of cooling medium; however, for the sake of simplicity but one absorber is shown so equipped.

As shown in the drawing, the units of the assembly are preferably so disposed that the water from the condenser travels to the absorber C and through the absorbers without pumping, the flow of liquids throughout being dependent merely upon the action of gravity. It will be noted, too, that the compressor is located ahead of the portions of the apparatus which serve to convert the ammonia-air mixture into steam, nitrogen oxides, and air. In this way, while the pressure imparted by the compressor is utilized throughout the system and particularly in the absorbers, (the system of course being a closed one from end to end) yet the very great difficulties of constructing an apparatus for compressing a mixture of steam, nitrogen oxides and air are avoided, merely the relatively simple apparatus for compressing an ammonia-air mixture being called for. Also, attention is called to the interposition of the cooler between the ammonia oxidizer and the condenser. With this cooler the gases may be cooled considerably, say from 900° down to 250° C. prior to entering the condenser, and thus the more important cooling, (from the point of view of the process) that is, that down to say 20° C., can be accomplished very quickly indeed in the condenser, the condenser not having the burden of cooling the gases over the whole range. As will be understood, and as indicated in a general way in the drawing, such valves, U-tubes, and so forth, including check valves or the like for holding desired pressure throughout the system while allowing relief of excess pressure and escape of gases (as at 13), condensate (as at 27), and acid (as at 11ª) are provided.

In detail, the process may be carried out as follows, it being understood that the procedure given is by way of example merely and not by way of restriction:—

A mixture of ammonia and air, containing, for example, 10% $NH_3$ (by volume) which has been prepared in any of the well-known ways, is continuously supplied to the compressor where it is compressed, a pressure of 4 to 10 atmospheres being desirable and feasible though higher pressures may be used, and the compressed mixture is passed to and through the catalytic oxidizer. Here, with conditions of flow, contact, and so on regulated as is understood by those skilled in the ammonia oxidation art, the reaction is of such completeness that 90% or more of the ammonia is converted into nitric oxide, NO. The reaction liberates considerable heat so that the gases leaving the oxidizer have a temperature approximately between 700° and 900° C., the exact temperature depending on the original ammonia concentration.

The gases now pass to the condenser, preferably being first passed through a cooler, as illustrated, with the advantages heretofore explained. In the cooler the temperature is considerably reduced, but is so regulated that the gases are not cooled to such a point that other oxides of nitrogen, particularly nitrogen peroxide, are formed, since in preferable accordance with the present invention there is to be avoided the formation of nitrogen peroxide prior to the substantial removal of water from the gases. The condenser is of such size, and so regulated, that the cooling of the gases to a temperature at which water vapor is condensed, and also the oxidation of nitric oxide to nitrogen peroxide is begun, is very rapid, indeed a matter of a few seconds (1 to 10). Desirably the cooling is to room temperature (20° C.), or below. As previously indicated, the condenser is of a type wherein the condensate flows back countercurrent to the ascending stream of hot gas. By cooling quickly and treating the condensate formed in the upper cooler portions of the condenser with the hot stream of gas containing its nitrogen oxides in lower degree of oxidation than corresponds to $N_2O_3$, the drawing off of a condensate containing a minimum amount of $HNO_3$ is assured. With proper regulation substantially pure water may be formed, and, for the purposes of the invention it is desirable that this condition be as closely adhered to as practical, and certainly the condensate should not be stronger than 10 to 20% $HNO_3$. The condensate is continuously withdrawn from the condenser and run through the pipe 8 to absorber C; and by partly opening the valve 27 in the pipe 8 a portion of the condensate may be withdrawn from the system, wherefore less than the total water can be passed to the absorbers and the proper amount fed to the absorbers to give acid of the desired high strength. It is to be noted that by working as indicated the formation of weak acid, by the making and absorption of nitrogen peroxide in the presence of all the water produced, is substantially avoided, and provisions are made for the use of only as much water as is required to directly give the strong acid desired. Of course, if for any reason it be desired to make weak acid, water as required can be added to the system, at any suitable point, as at pipe 28.

From the condenser the gases are passed to the oxidizing chamber. This is of such size as to ensure the remaining of the gases therein for sufficient length of time for the nitric oxide to be substantially completely oxidized to nitrogen peroxide. This is a time reaction but, as heretofore noted, with pressure, in accordance with the invention, the speed of the reaction is greatly increased. If found advisable air may be admitted to the oxidizing chamber to provide additional oxygen. Also, cooling may be used.

The gases (nitrogen oxides, comprising primarily nitrogen peroxide) are now passed to the absorbers and successively bubbled through the countercurrent of successively weaker acid (substantially water in absorber C). In the absorbers the regulation of temperature, flow, and so on is carefully controlled, as will be understood by those skilled in the art, in consideration of the fact that the reaction $3NO_2 + H_2O = 2HNO_3 + NO$ is a reversible one at somewhat high temperatures, and in consideration of the fact that conditions should be maintained such that a high strength nitric acid is to be obtained. As before stated, nitric acid of 70%, or better, is readily obtainable. As previously indicated, a temperature of 20° C., or below, is advisable, temperatures of 0° C., or somewhat below, being feasible, and if desired the temperature in the absorbers may be somewhat below that in the condenser and oxidizing chamber. If desired, the residual gases escaping from the system, as at the pipe 13, may be expanded in a refrigerating device as conventionally indicated in the drawing and applied to the cooling of units of the system as required (connecting piping being omitted in the drawing to avoid confusion), and the refrigeration thus obtained will be a factor in determining the best temperatures, economically, for the system. Also, of course, the power obtained by the expansion of the residual gases can be used in compressing the gases supplied to the system. As to these supplied gases, although air has been more particularly mentioned it will, of course, be understood that the required oxygen may be provided in any suitable way, as by oxygen-enriched air and so on.

We claim:

1. In the production of nitric acid by the catalytic oxidation of ammonia under pressure to produce nitric oxide and water vapor, the improvements consisting in initially cooling the hot gases from the oxidation by over 400° C. without, however, condensing water to any substantial extent, further cooling the gases to separate a considerable quantity of aqueous liquid, promoting the oxidation of nitric oxide to nitrogen peroxide, bringing the latter into contact with the said condensed aqueous liquid under pressure and in countercurrent flow in several stages, withdrawing the resulting nitric acid of over 50 percent concentration.

2. In the production of nitric acid by the catalytic oxidation of ammonia under pressure to form nitric oxide and water vapor, the improvement characterized by initially cooling the gases to about 250° C., thereupon further cooling the gases to separate a large portion of aqueous liquid therefrom and removing the nitric gases at about room temperature, oxidizing the latter to nitrogen peroxide, absorbing the latter in the said aqueous liquid separated by countercurrent flow in stages to form nitric acid of over 50% concentration.

3. In the production of nitric acid by the catalytic oxidation of ammonia under pressure to form nitric oxide and water vapor, the improvement characterized by initially cooling the gases to a temperature above the condensation point of the water, further cooling the gases to separate a large portion of aqueous liquid, oxidizing the nitric oxide to nitrogen peroxide, absorbing the nitrogen peroxide under pressure and at a low temperature in countercurrent flow with the said aqueous liquid condensed so as to produce the maximum concentration of nitric acid therefrom.

4. In the production of nitric acid by the catalytic oxidation of ammonia under pressure to form nitric oxide and water vapor, the improvement characterized by initially cooling the gases to a temperature of about 250° C., further cooling the gases to about room temperature with countercurrent flow of the uncondensed gases and the aqueous liquid, separating the aqueous liquid, promoting the oxidation of nitric oxide to nitrogen peroxide, absorbing the latter in the said aqueous liquid separated by countercurrent flow therewith to form a maximum nitric acid concentration, the absorption process being conducted under a pressure of several atmospheres.

5. In the production of nitric acid by the oxidation of ammonia, the process which comprises, catalytically oxidizing ammonia thereby producing nitric oxide and water vapor, initially cooling the gases to a temperature substantially not below 250° C., further quickly cooling the gases to substantially room temperature with countercurrent flow of the uncondensed gases and the condensate, and separating the condensate, promoting the oxidation of nitric oxide to nitrogen peroxide, absorbing the nitrogen peroxide in the aqueous condensate, and withdrawing the resulting nitric acid, performing the absorbing under a pressure substantially between 4 and 10 atmospheres and at a temperature of approximately 20° C., or below.

6. In an apparatus assembly for the production of nitric acid by the oxidation of ammonia: in series, a gas compressor adapted for connection with a supply means of oxygen and ammonia, a catalytic ammonia oxidizer, a condenser having provisions for the countercurrent contact flow of gases and condensate and for the collection and removal of condensate, an oxidizing chamber, and a countercurrent absorption assembly; connections between said units for the preservation throughout the system of the pressure initially imposed by the compressor, the connection from the oxidizing chamber to the absorption assembly being arranged for the introduction of the gases to one end of said assembly; connections from the condensate collector of the condenser to the other end of the absorption assembly, means for discharging residual gases from said other end of the assembly, and means for the withdrawal of liquid from the said one end of the assembly.

In testimony whereof we affix our signatures.

GUY B. TAYLOR.
FRED C. ZEISBERG.